United States Patent [19]

Kakinuma

[11] Patent Number: 5,046,594
[45] Date of Patent: Sep. 10, 1991

[54] ELECTROMAGNETIC CLUTCH
[75] Inventor: Katsuhiko Kakinuma, Maebasi, Japan
[73] Assignee: Sanden Corporation, Gunma, Japan
[21] Appl. No.: 596,538
[22] Filed: Oct. 12, 1990
[30] Foreign Application Priority Data Oct. 13, 1989 [JP] Japan ............................. 1-119153[U]

[51] Int. Cl.⁵ ............................................. F16D 27/00
[52] U.S. Cl. ................................................ 192/84 C
[58] Field of Search ........................ 192/84 C; 29/256

[56] References Cited

U.S. PATENT DOCUMENTS

| 2,377,046 | 5/1945 | Siegerist | 403/356 |
| 3,434,747 | 3/1969 | Nichols | 403/16 |
| 4,493,407 | 1/1985 | Newton | 192/84 C |
| 4,514,890 | 5/1985 | Stewart | 29/256 |

FOREIGN PATENT DOCUMENTS 2008175 1/1970 France .
60-164018 8/1985 Japan .
63-6225 12/1988 Japan ................... 192/84 C Primary Examiner—Allan D. Herrmann
Assistant Examiner—Nicholas Whitelaw
Attorney, Agent, or Firm—Banner, Birch, McKie & Beckett

[57] ABSTRACT

A clutch is disclosed which includes an electromagnetic drive mechanism. A hub is frictionally secured on a drive shaft and has a flange portion radially extending from its outer peripheral surface. An annular armature plate is coupled to the flange and spaced from an axial end surface of the rotor. A plurality of threaded holes are formed in the flange portion of the hub to permit the use of a tool which detachs the hub from the drive shaft. An annular plate is disposed at an inner surface of the flange portion of the hub to cover the plurality of holes so that water from the outside of the electromagnetic clutch is prevented from entering through the holes. Thus, corrosion of internal parts is prevented and clutch life and performance are enhanced.

4 Claims, 6 Drawing Sheets

ELECTROMAGNETIC CLUTCH

BACKGROUND OF THE INVENTION

1. Field of the Invention

This invention relates to an electromagnetic clutch assembly, such as for use in controlling the transmission of power from an automobile engine to the refrigerant compressor in an automobile air conditioning system and, more specifically, to the construction of the driven mechanism of an electromagnetic clutch assembly.

2. Description of the Prior Art

FIGS. 1 and 2 show one prior art embodiment of an electromagnetic clutch assembly 10' intended to be coupled to a refrigerant compressor in an automobile air conditioning system. For purposes of explanation only, the right side of FIG. 2 will be referred to as the forward or front end, while the left side of FIG. 2 will be referred to as the rearward or rear end. As shown in FIG. 2, clutch rotor 15, electromagnetic coil 20, housing 21 and bearing 16 generally constitute the driving mechanism 100 of the electromagnetic clutch assembly. Hub 24, leaf springs 27, stopper, plate 28 and annular armature plate 26 generally constitute the driven mechanism 200' of the electromagnetic clutch assembly.

Electromagnetic clutch 10' is coupled to a compressor housing 11 which is provided with a tubular expression 12 surrounding a compressor drive shaft 13. Drive shaft 13 is supported for rotation within the housing 11 along horizontal axis X by bearings (not shown). Axis X is an axis about which hub 24, armature plate 26 and clutch rotor 15 also rotate.

Clutch rotor 15 is made of a magnetic material, such as steel, and comprises an outer annular cylindrical portion 151, an inner annular cylindrical portion 152 and an axial end plate portion 153 which connects the outer and inner annular cylinders 151 and 152 at their forward ends. Thus, an annular U-shaped cavity 17 is defined by portions 151, 152 and 153. A plurality of V-shaped grooves 18 are provided on the outer peripheral surface of outer annular cylindrical portion 151 for receiving a belt (not shown) to couple the rotor 15 to the output of the automobiles engine (not shown). Rotor 15 is rotatably supported on tubular extension 12 of compressor housing 11 by bearing 16 which surrounds the outer surface of tubular extension 12.

Axial end plate portion 153 includes one or more concentric slits 19 which are disposed on one or more concentric circles. These slits 19 define a plurality of annular or arcuate magnetic pieces with the surface of the poles on the axial end plate portion.

Electromagnetic coil 20 is disposed in annular cavity 17 of clutch rotor 15 to supply a magnetic flux (not shown) for attracting armature plate 26 to the axial end plate portion 153 of the rotor 15. The coil 20 is contained within an annular magnetic housing 21. Housing 21 has a U-shaped cross section and is fixed to a supporting plate 22, which is secured to the axial end surface of housing 11 by a plurality of rivets 221. A small air gap is maintained between coil housing 21 and clutch rotor 15.

Hub 24 comprises a tubular member 241 which is secured tightly on the terminal end portion of the drive shaft 13 by forcible insertion. Flange portion 242 extends radially from the front end of tubular member 241 and may be integrally formed with the tubular member or formed separately and affixed by a known securing method, such as welding. The relative rotation between hub 24 and drive shaft 13 is prevented by a key-keyhole mechanism 131 provided at the terminal end portion of drive shaft 13. Hub 24 is further secured to the terminal end portion of drive shaft 13 by nut 25 which is threaded on the terminal end of drive shaft 13.

Annular shim 132 is disposed between a rearward end of tubular member 241 of hub 24 and an annular ridge 132a. Ridge 132a is formed on the outer peripheral surface of the terminal end portion of drive shaft 13. The shim and ridge arrangement allows for the adjustment of air gap "1" between annular armature plate 26 and axial end plate portion 153 of rotor 15.

Annular armature plate 26 is made of magnetic material, is concentric with hub 24, and has a friction surface 26a which faces the friction surface 153a of axial end plate portion 153 of rotor 15. Armature plate 26 has a plurality of elongated apertures 261 disposed on a concentric circle, and is coupled to flange portion 242 of hub 24 by a plurality of leaf springs 27. Each leaf spring is fixed at one end to armature plate 26 by rivet 31, and at the other end to the rearward surface of stopper plate 28. Stopper plate 28 and the other end of each leaf spring 27 are secured to each other and to flange portion 242 through spacing member 30 by rivets 29. By this arrangement, armature plate 26 may move relative to hub 24 along axis X upon the deflection of leaf springs 27.

Thus, when electromagnetic coil 20 is energized, armature plate 26 is magnetically attracted to axial end plate portion 153 of rotor 15. Armature plate 26 will move rearwardly along axis X so that friction surface 26a engages friction surface 153a. This engagement will transmit the engine-driven rotation of clutch rotor 15 through leaf springs 27 and hub 24 to drive shaft 13.

Conversely, when electromagnetic coil 20 is not energized, leaf springs 27 bias armature plate 26 away from rotor 15. Thus, drive shaft 13 is not rotated by clutch rotor 15, and the compressor is not driven.

Since tubular member 241 of hub 24 is tightly secured on the terminal end portion of drive shaft 13, the driven mechanism cannot be easily removed from the drive shaft 13. Therefore, tool 300, shown in FIG. 3, is used to detach hub 24 from the terminal portion of drive shaft 13. Tool 300 includes an L-shaped cylindrical steel bar member 301, a thread rod 302 extending perpendicularly from the longer straight portion 301a of L-shaped member 301, and a circular plate 303 having a threaded hole 303a at its center to receive rod 302. A plurality of radially disposed elliptical slots 303b are bored at equal intervals through circular plate 303. Three identical bolts 304, each having bolt head 304a, shaft region 304b and threaded shaft region 304c along one-third of its length, are loosely held in slots 303b. Movement of the bolt within the shaft is restricted by bolt head 304a and flange portion 304d, formed at the center of shaft region 304b.

Use of tool 300 can be best described with reference to FIGS. 1 and 2. A plurality of identical threaded holes 242a are bored through flange portion 242 of hub 24. Furthermore, a plurality of holes 262 are bored through stopper plate 28 in alignment with holes 242a. Tool 300 is used in the following manner. After detaching nut 25 from the terminal end of drive shaft 13, the bottom end of rod 302 is placed on the outer end surface of drive shaft 13, perpendicularly to the front face of stopper plate 28. Each threaded shaft region 304b of each bolt 304 is aligned with, and screwed into, respective holes 262 and 242a. L-shaped cylindrical bar 301 is turned and threaded rod 302 is screwed through threaded hole 303a to push rearwardly on the terminal end of drive shaft 13. Thus, the driven mechanism, specifically hub 24, moves axially relative to the drive shaft 13 and is thereby detached from the terminal end of the drive shaft.

In the prior art embodiment, water frequently enters the clutch assembly through holes 262 and 242a, accelerating the corrosion of bearing 16. This has been a major disadvantage of the prior art assemblies, causing degradation of clutch performance and shortening of life expectancy.

SUMMARY OF THE INVENTION

Accordingly, it is an object of this invention to provide an electromagnetic clutch assembly of long life expectancy and enhanced performance.

It is a further object of this invention to prevent corrosion of the internal bearing of an electromagnetic clutch assembly caused by water entering the assembly from outside.

The present invention provides an electromagnetic clutch including a first rotatable member having a magnetic axial end plate. A second rotatable member includes a drive shaft and a hub having a flange radially extending from its outer peripheral surface. The hub is frictionally mounted on the drive shaft. An annular armature plate is elastically coupled to an outer peripheral flange of the hub and faces the axial end plate of the first rotatable member with an axial air gap therebetween. An electromagnetic device is disposed within the first rotatable member for attracting the armature plate to the axial end plate of the first rotatable member.

The flange of the hub comprises a plurality of threaded holes, permitting the use of a detachment device to remove the hub from the drive shaft. An annular member is fixedly disposed at an inner surface of the flange of the hub so as to cover the holes, thereby preventing water from entering the interior of the electromagnetic clutch and preventing corrosion of its interior bearing.

DETAILED DESCRIPTION OF THE PREFERRED EMBODIMENTS

Figure 4:
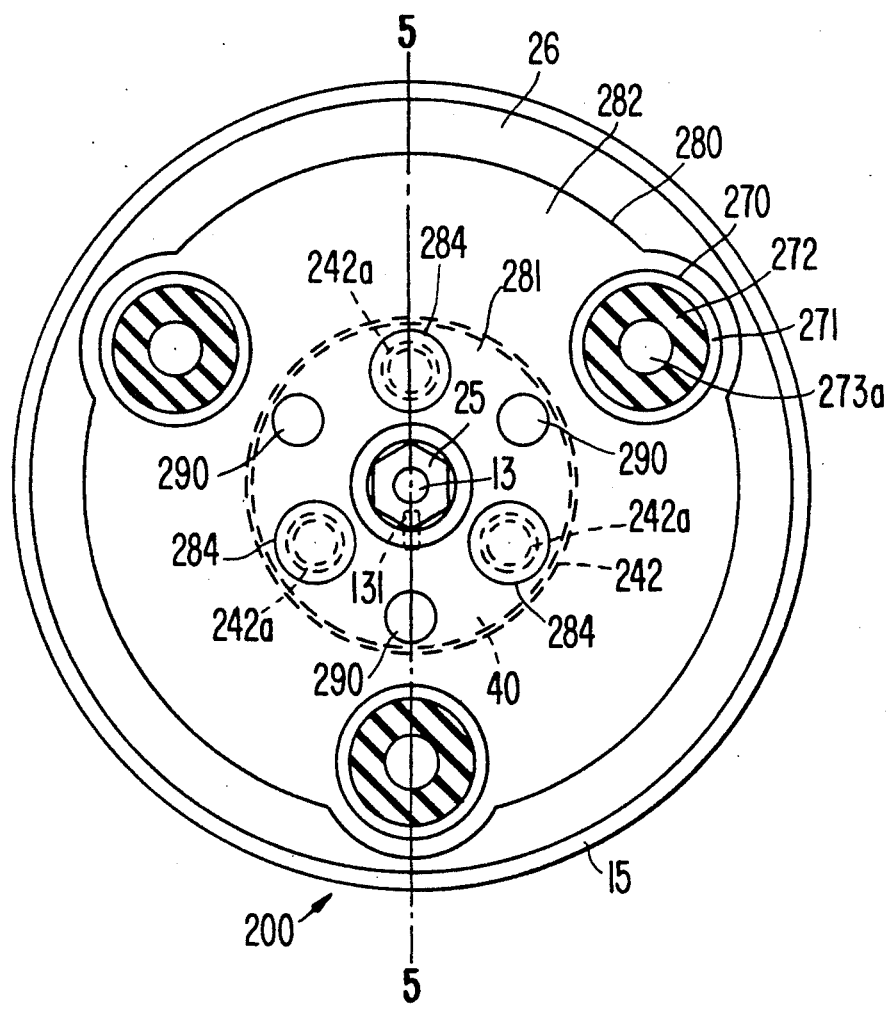
FIG. 4 illustrates a side view of an electromagnetic clutch assembly in accordance with a first embodiment of the present invention.
Figure 5:
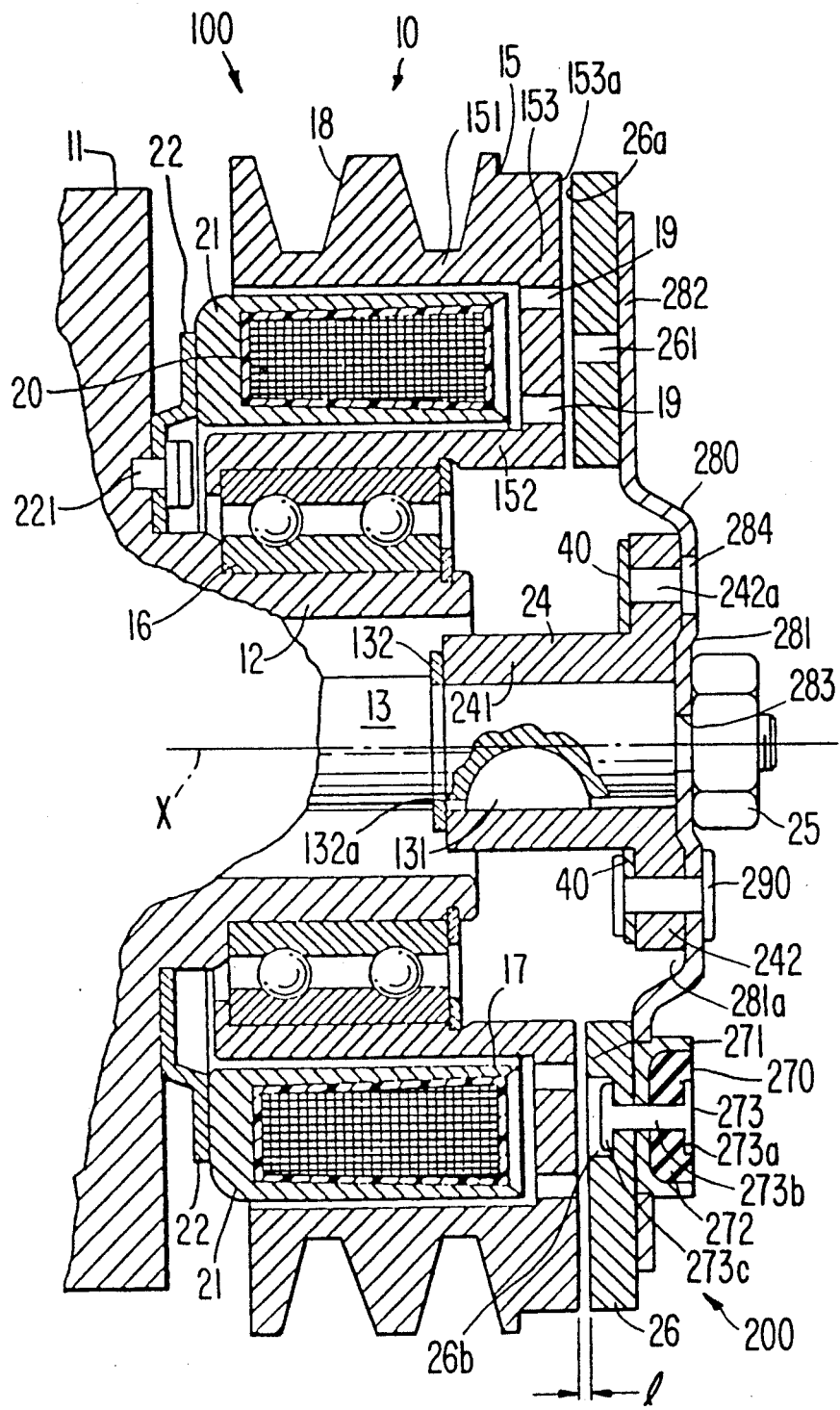
FIG. 5 illustrates a vertical sectional view taken along line 5-5 of FIG. 4.

Referring to FIGS. 4 and 5, an electromagnetic clutch assembly 10 in accordance with a first embodiment of the present invention is shown. For purposes of explanation, the right side of FIG. 5 will be referred to as the forward or front and the left side of FIG. 5 will be referred to as the rearward or rear end. In FIGS. 4 and 5, like numerals are used to denote the corresponding elements of FIGS. 1 and 2.

In FIGS. 4 and 5, drive mechanism substantially includes clutch rotor 15, electromagnetic coil 20, housing 21 and bearing 16, as in the prior art assembly. Driven mechanism 200 of the present invention includes armature plate 26, circular plate 280 located in front of armature plate 26, a plurality of damper assemblies 270 located at a front surface of circular plate 280 and annular plate 40 located at a rear end surface of flange portion 242 of hub 24.

Circular plate 280 comprises a shallow cup-shaped region 281 having indent 281a at its rearward side and annular region 282 radially extending from the periphery of cup-shaped region 281. A rear surface of annular region 282 is in contact with a front surface of armature plate 26 opposite rear friction surface 26a. A rear surface of shallow cup-shaped region 281 is in contact with a front axial surface of flange portion 242 of hub 24.

Damper assemblies 270 are disposed at equal intervals on the front surface of annular region 282. In this embodiment, three identical damper assemblies 270 are used. Each damper assembly 270 includes cup-shaped casing 271 open at its front side having an annular elastic member 272 made of, i.e., rubber disposed within it. Elastic member 272 is fixed to an inner surface of casing 271. A rivet 273 having a flange portion 273a and a shaft portion 273a axially penetrates annular elastic member 272, a bottom of casing 271 and armature plate 26, and is caulked at its rearward end so as to slightly compress rubber member 272 in an axial direction. Caulked portion 273c at the rearward end of shaft portion 273b of rivet 273 is disposed within cylindrical cavity 26b formed in friction surface 26a of armature plate 26.

Circular plate 280 is provided with hole 283 bored through a center of shallow cup-shaped region 281 to permit plate 280 to be affixed to the terminal portion of drive shaft 13. Threaded nut 25 secures hub 24 and circular plate 280 to drive shaft 13.

A plurality of identical, equally radially spaced threaded holes 242a are bored through flange portion 242 of hub 24. In this embodiment, three holes are used. A corresponding number of aligned holes 284 are bored through a circumferential portion of shallow cup-shaped region 281. Holes 242a and 284 permit tool 300 to be used in a manner as described above to remove hub 24 and circular plate 280 from drive shaft 13.

Annular plate 40 is disposed at a rear surface of flange portion 242 of hub 24 so as to cover a rear opening of holes 242a. Annular plate 40 and circular plate 280 are firmly secured by rivets 290 to the rear and front surfaces of flange portion 242, respectively.

In this preferred embodiment, when electromagnetic coil 20 is energized, the resulting magnetic flux attracts armature plate 26 to axial end plate portion 153 of rotor 15, further compressing elastic member 272 in the axial direction. Thus, the rotation of the automobile engine is transmitted to the drive shaft 13 through clutch rotor 15, armature plate 26, damper assemblies 270, circular plate 280 and hub 24. Furthermore, the impact force caused by the torque of cup-shaped casing 271 when armature plate 26 contacts axial end plate portion 153 of rotor 15 is dampened by the deformation of elastic member 272.

Conversely, if coil 20 is not energized, armature plate 26 is biased away from axial end plate portion 153 of rotor 15 by the resiliency of elastic member 272 which acts to maintain a small air gap "1" between armature plate 26 and axial end plate portion 153.

The annular plate 40 of the present invention is disposed at a rear surface of flange portion 242 of hub 24 so as to cover rear opening of holes 242a. Thus, water entering from outside the electromagnetic clutch assembly through holes 284 and 242a is blocked by annular plate 40 and, thereby, is prevented from reaching bearing 16 mounted on the outer surface of tubular extension 12. The present invention thus prevents corrosion of the internal parts of an electromagnetic clutch assembly, increasing its life expectancy and enhancing its performance.

Figure 1:
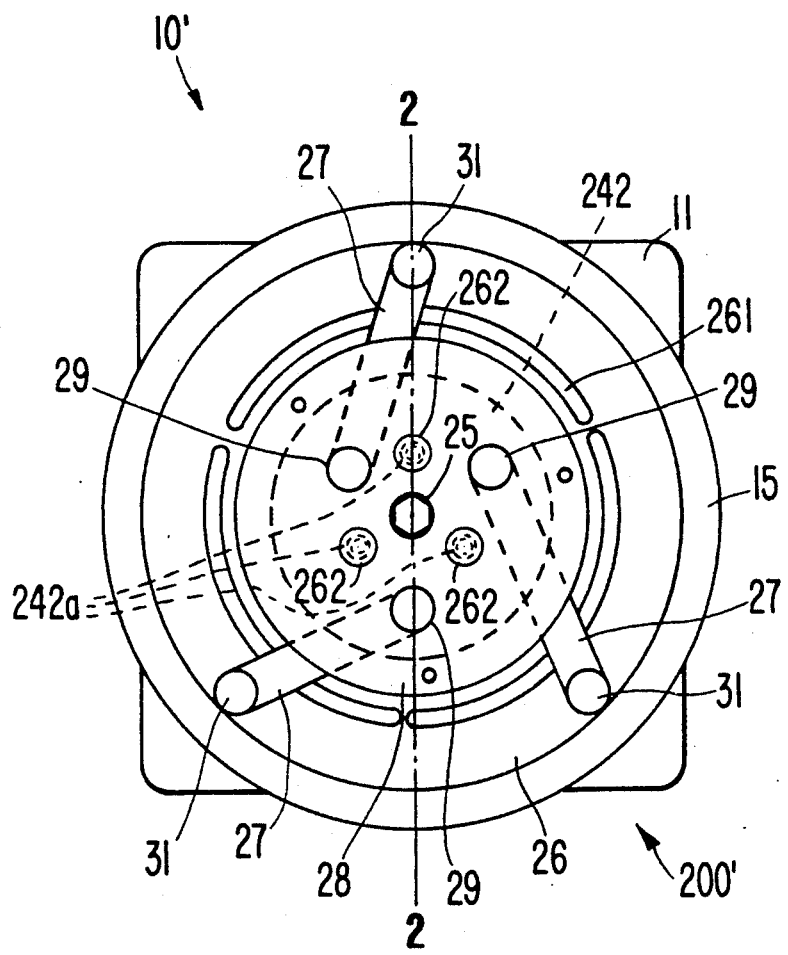
FIG. 1 illustrates a side view of an electromagnetic clutch assembly in accordance with one embodiment of the prior art.
Figure 2:
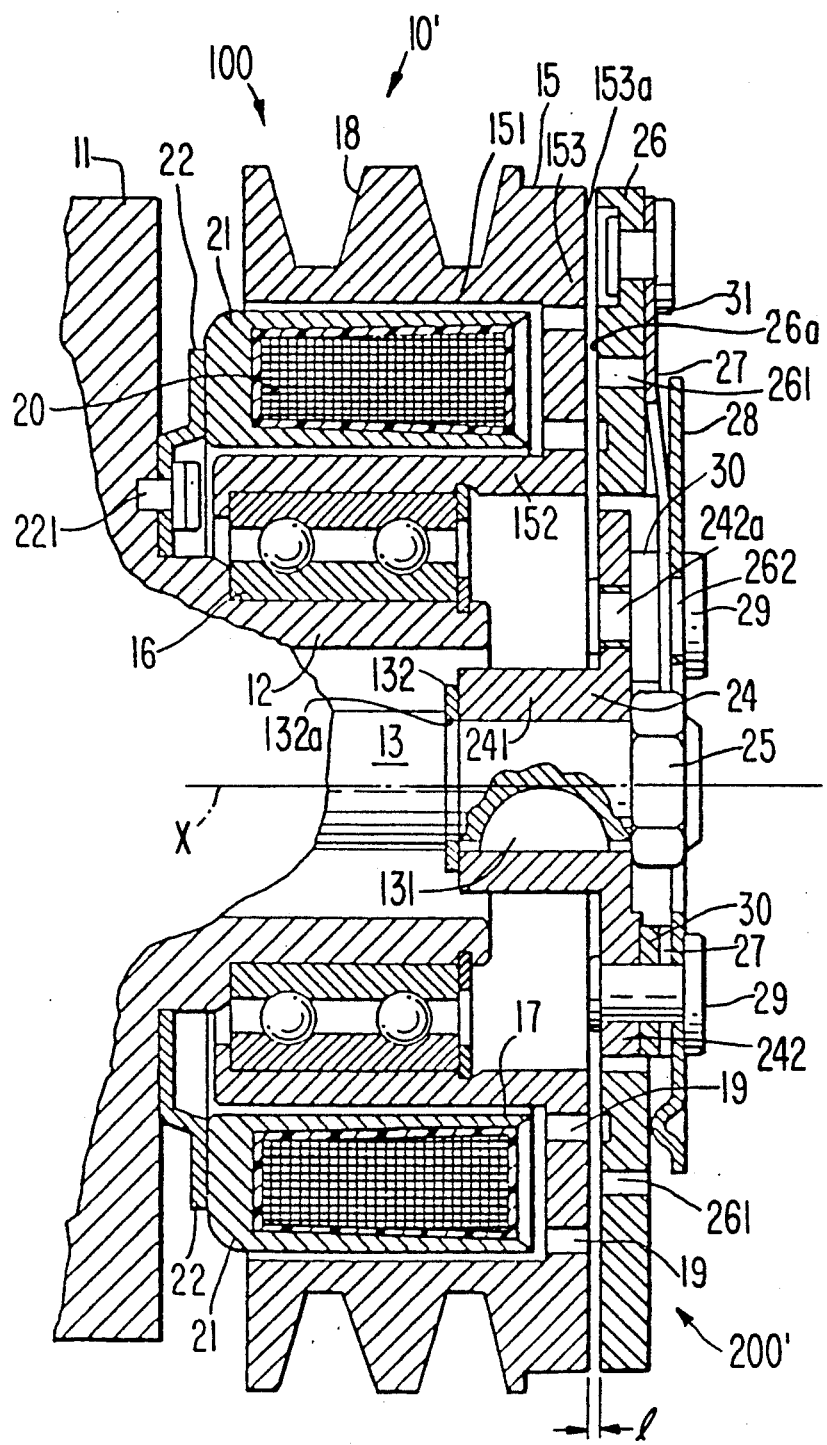
FIG. 2 illustrates a vertical sectional view taken along line 2—2 of FIG. 1.
Figure 3:
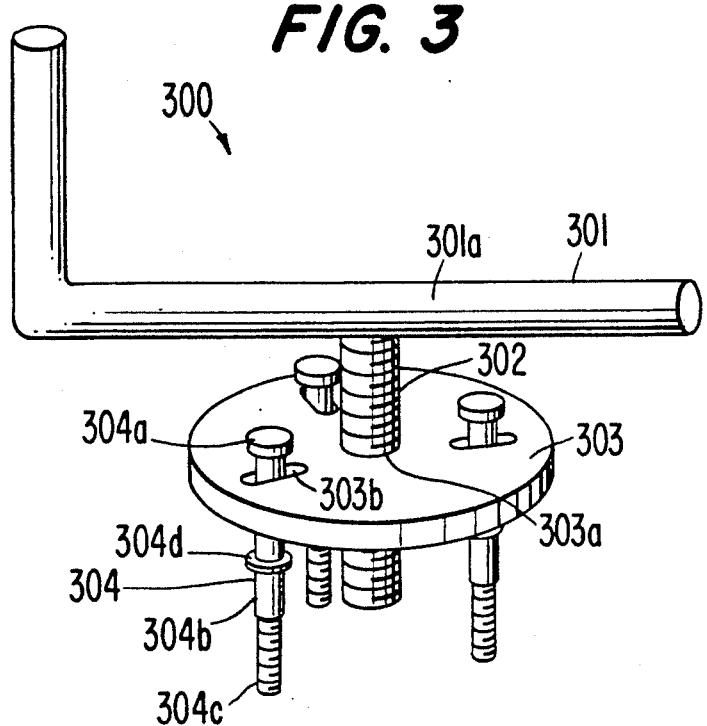
FIG. 3 illustrates a perspective view of a tool used for detaching a driven mechanism from a drive shaft.
Figure 6:
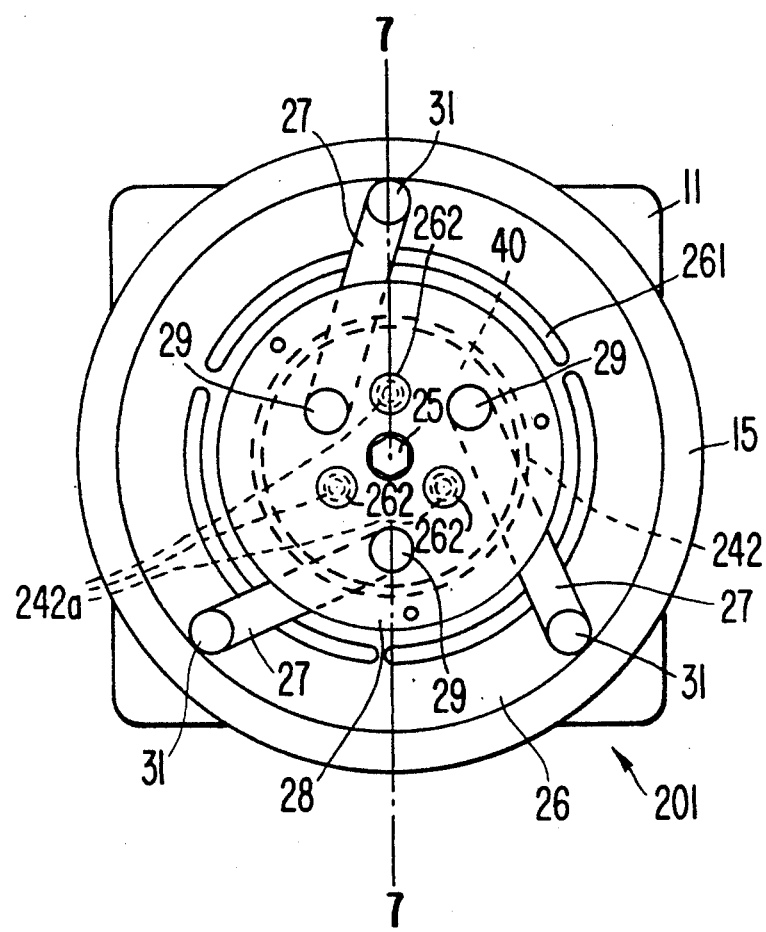
FIG. 6 illustrates a side view of an electromagnetic clutch assembly in accordance with a second embodiment of the present invention.
Figure 7:
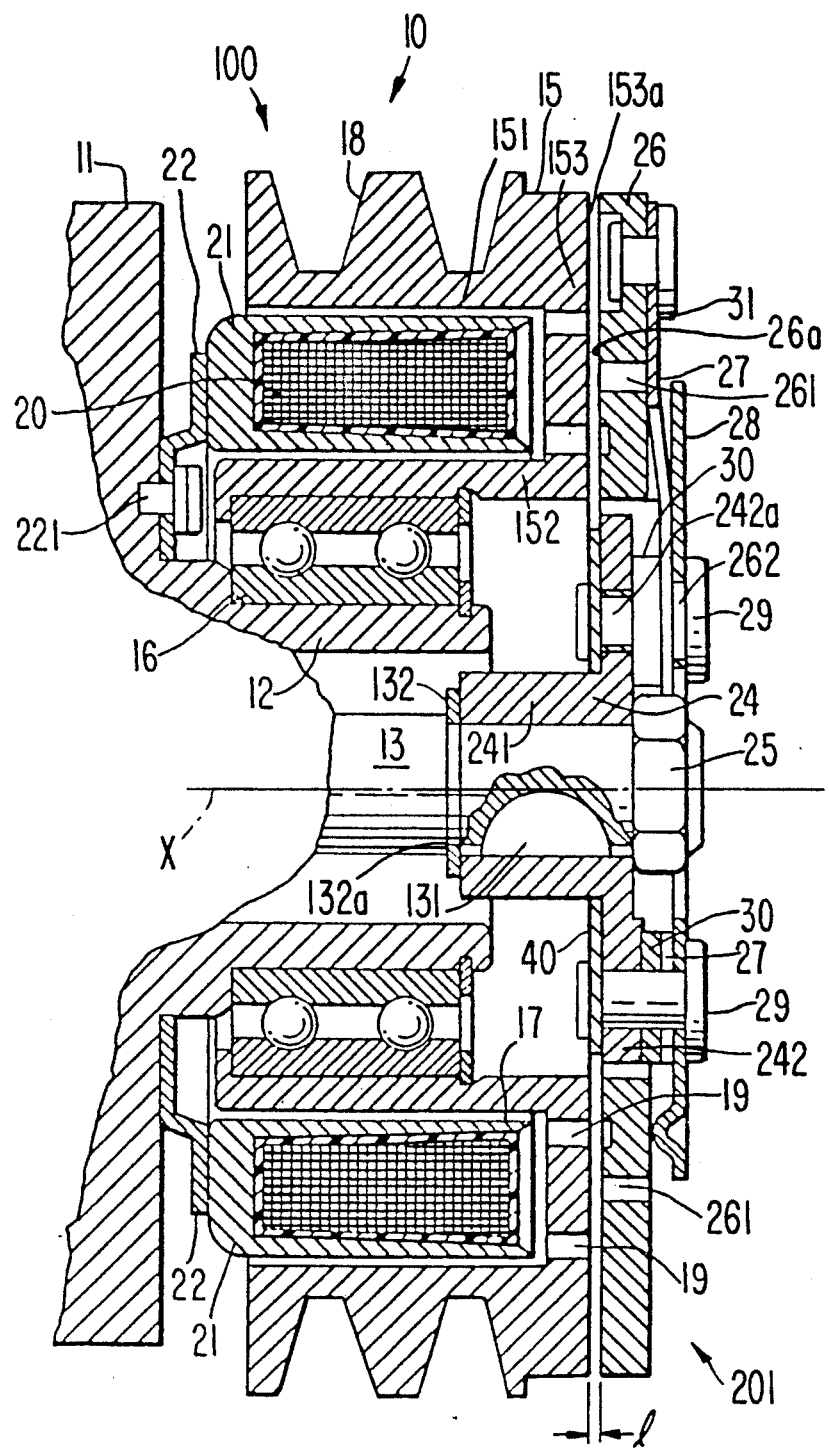
FIG. 7 illustrates a vertical sectional view taken along line 7—7 of FIG. 6.

FIGS. 6 and 7 illustrate a second embodiment of the present inversion whereby like numerals are used to designate corresponding elements described in FIGS. 1 and 2. In this embodiment, the damper assemblies 270 and the circular plate 281 of the first preferred embodiment have been replaced by leaf spring assembly 27 and stopper plate 28 as substantially described with respect to FIGS. 1 and 2. Driven mechanism 201 includes annular plate 40 disposed at a rear surface of flange portion 242 of hub 24 so as to cover rear opening of threaded holes 242a which penetrate flange portion 242. Annular plate 40 is firmly secured to the rear surface of flange portion 242 by rivets 29, which also secure stopper plate 28 and one end of each leaf spring 27 to the front of flange portion 242 through spacing member 30. Again, annular flange 40 serves to prevent water from entering the electromagnetic clutch assembly and results in a substantial increase in its life and performance.

Although this invention has been described in detail in connection with the preferred embodiments, the preferred embodiments are an example only and are not restrictive of the invention. It will be easily understood by those skilled in the art that other variations and modifications can easily be made within the scope of this invention, which is defined by the appended claims.

I claim:

1. In an electromagnetic clutch assembly including a first member rotatable about an axis and having an axial end plate of magnetic material, a second member rotatable about said axis and comprising a tubular member and a flange portion extending from an outer peripheral surface of said tubular member, said second rotatable member frictionally held on a drive shaft, an annular armature plate of magnetic material coupled to said flange portion of said tubular member so that said annular armature plate is capable of limited movement relative said tubular member along said axis, said annular armature plate facing said axial end plate of said first rotatable member with an axial air gap therebetween and electromagnetic means associated with said first rotatable member for attracting said armature plate into contact with said axial end plate such that the rotation of said first rotatable member can be transmitted to said second rotatable member through said annular armature plate when said electromagnetic means is activated, said flange portion of said tubular member comprising a plurality of holes for use in detaching said tubular member from said drive shaft, an improvement comprising:
blocking means for blocking water from entering said electromagnetic clutch assembly from outside the assembly through said holes.

2. The electromagnetic clutch assembly according to claim 1, wherein said blocking means comprises an annular member disposed at an inner surface of said flange portion of said tubular member so as to cover said holes.

3. An electromagnetic clutch assembly comprising:
drive means comprising a first member rotatable about an axis;
electromagnetic means associated with said drive means for providing a magnetic flux to said drive means;
driven means comprising a second member rotatable about said axis, a drive shaft and a tubular member having a flange portion and disposed about said drive shaft, said second rotatable member coupled to said flange portion of said tubular member so that said second rotatable member is capable of movement relative to said tubular member along said axis, wherein said drive means and said driven means are engaged upon activation of said electromagnetic means and are disengaged upon deactivation of said electromagnetic means in order to control the transmission of rotational movement from said drive means to said driven means;
a plurality of holes on said flange portion of said tubular member for us in removing said tubular member from said drive shaft; and
blocking means on said flange portion of said tubular member for blocking the entrance of water through said plurality of holes from outside said electromagnetic clutch assembly.

4. An electromagnetic clutch assembly according to claim 3, wherein said blocking means comprises an annular member disposed at an inner surface of said flange portion of said tubular member so as to cover said plurality of holes.

* * * * *